United States Patent Office 3,085,030
Patented Apr. 9, 1963

3,085,030
WRAPPING ARTICLE AND METHOD OF
MAKING SAME
Thomas C. Hendrickson, Wallingford, and Lamont
Hagan, Guilford, Conn., assignors to Olin Mathieson
Chemical Corporation, a corporation of Virginia
No Drawing. Filed Aug. 29, 1958, Ser. No. 757,936
2 Claims. (Cl. 117—145)

The present invention relates to a transparent wrapping material having a high resistance to penetration by oily or greasy substances. More particularly, it pertains to a flexible odorless base sheet of regenerated cellulose having bonded to its surface a strongly anchored coating having a low permeability to oils and greases such as those contained in food products.

Transparent sheet wrapping material, having a regenerated cellulose or similar base and adherent transparent coatings, have been used extensively in recent years in the packaging of foods, largely because of the properties of cellophane as a packaging material. When cellophane is used in packaging food products containing grease or oil, such as shortening or the like, there is a tendency for the grease to penetrate or permeate the cellophane and to discolor labels or other material in contact with the package. It has been possible to reduce the amount of such penetration by the use of various coating materials which have a low permeability to grease or oil materials found in the food. However, the application of these coatings has introduced a number of technical difficulties into the manufacture of the wrapping and the modification of manufacturing procedure to avoid these difficulties has added to the cost of the product.

It is one of the objects of the subject invention to provide a method of forming a coated sheet wrapping material having a low permeability to grease and oil. Another object is to provide a composition which facilitates the economical formation of coatings on base sheets for use in the packaging of foods. A further object is to provide an economical method for forming transparent, flexible sheet wrapping materials having a low permeability to grease and oils, such as are contained in the food products. Other objects will be in part pointed out and in part apparent from the description which follows.

In one of its broader aspects, the objects of the invention are achieved by forming a composition containing a copolymer of vinylidene chloride and acrylonitrile in various proportions together with a solvent-soluble resin and an acid catalyst, coating this material onto a base sheet, such as a regenerated cellulose base sheet, and heating the coated sheet to anchor the coating composition and to vaporize the solvents from the composition.

The following are provided as illustrative examples of methods, compositions, and articles of the subject invention, although it will be understood that the examples are given for illustrative purposes only and are not to be interpreted as defining or limiting the scope of the subject invention.

EXAMPLE I

Twenty (20) grams of a copolymer of vinylidene chloride and acrylonitrile were added to a beaker containing 65 grams of methyl ethyl ketone. Approximately 0.3 gram of solid solvent-soluble melamine-formaldehyde resin, designated Uformite MM–55 and available from the Rohm & Haas Company, was added to this solution together with 0.2 gram of maleic acid. The weight of melamine-formaldehyde added represented about 1.5% of the dissolved copolymer solids and the maleic acid represented about 1% thereof. The composition was heated and stirred until a clear solution formed.

The resultant lacquer was coated onto a regenerated cellulose base sheet leaving a deposit of approximately 1.75 grams per square meter of solids on each side of the base sheet. It was then dried for approximately 7 seconds by passing it through a heating tower maintained at a temperature of about 110° C. The resultant product was subjected to a number of tests. It was found that the coating was very securely anchored to the base sheet, remaining adhered even after immersion for more than 7 hrs. in water at 75° C.

Further, it was found that when the formed sheet was contacted by products containing grease or oil, there was substantially no penetration through the sheet.

The foregoing example described illustratively a preferred mode of carrying out the subject invention. It is preferred because of the superior results which are obtained, particularly the superior properties of the product produced. There are, however, a number of modified steps which may be substituted for the steps recited, and the practice of the invention with these modified steps is within the scope thereof.

One such step is the selection of the ratio of polymers to be employed. The ratio of vinylidene chloride to acrylonitrile in the preferred example is 9 to 1. Other ratios, for example, as low as 4 to 1, can be employed although the properties of the product are not the equivalent of those found when using the 9 to 1 ratio. The principal differences between the properties of the two coatings are with respect to their heat seal strength, anchorage and permeability to water vapor.

Heat seal strength is the resistance of a heat-sealed portion of the film to separation under various controlled temperature and humidity conditions; anchorage is the resistance of the coating to separation from the base sheet when immersed in water. Heat seal strength is measured in terms of the force required to separate two pieces of film sealed to each other. Anchorage is measured in terms of the time for failure of the coating to base sheet bond.

EXAMPLE II

Three compositions were prepared. The first contained 65% methyl ethyl ketone and 35% toluene by weight as the solvent, and 15% of the weight of the solution of a copolymer of vinylidene chloride and acrylonitrile in a weight ratio of 4 to 1. The composition also contained the additives as shown in Table A below, where the percentage of additives is by weight based on the weight of the polymer solids.

The two remaining compositions contained the polymers in a weight ratio of 9:1 and the other ingredients as shown in the table. The compositions were coated onto a softened regenerated cellulose base sheet to produce a final coating in grams per square meter as indicated in the table. The properties of water vapor permeability (IPV), heat seal strength, and anchorage are also listed.

Table A
PROPERTIES OF CELLOPHANE COATED WITH SARAN TYPE LACQUERS

| Weight ratio of vinylidene chloride to acrylonitrile | Ratio 4:1 | Ratio 9:1 | Ratio 9:1 |
|---|---|---|---|
| Solvent | (1) Methyl ethyl ketone: toluene (65:35) | (2) Methyl ethyl ketone: toluene (65:35) | (3) Cyclohexanone |
| Polymer solids, percent of solution | 15 | 20 | 15 |
| Additives (percent based on polymer solids): | | | |
| Maleic acid | 1.0 | 1.0 | 1.0 |
| Melamine formaldehyde resin | 1.5 | 1.5 | 1.5 |
| Stearic acid | 0.45 | 0.45 | |
| Paraffin wax | 0.45 | 0.45 | |
| Calcium carbonate (finely divided) | 0.26 | 0.26 | |
| Finely divided aluminum silicate clay | | | 0.5 |
| Beeswax | | | 1.0 |
| Coating weight in grams/square meter | 5.6 | 3.5 | 3.7 |
| IPV in grams of $H_2O$/100 square meters/hour | 195 | 55 | 108 |
| Heat seal in grams at: | | | |
| 75° F. and 35% R. Humidity | 25 | 365 | 320 |
| 75° F. and 81% R. Humidity | 50 | 100 | 108 |
| Anchorage, min. in water at 75° C | 360 | 240 | 300 |

[1] Methyl ethyl ketone: toluene (65:35).
[2] Methyl ethyl ketone: toluene (65:35).
[3] Cyclohexanone.

A suitable solvent-soluble melamine-formaldehyde resin is Uformite MM-55 obtained from the Rohm & Haas Company; a suitable paraffin wax is Sunoco 5512 obtained from the Sun Oil Company; a suitable finely divided calcium carbonate is Witcarb R obtained from the Witco Chemical Company; a suitable finely divided aluminum silicate clay is Slipex B obtained from the Alfred G. Wagner Company. The slip-inducing and blocking-prevention agents of choice are the combination of Slipex B and beeswax. It has been found that these agents, when used individually, are not satisfactory, but that they give superior results when used together.

From the foregoing example it is apparent that the properties of the coated film containing the polymer in the 9 to 1 ratio are superior, although those of the coated film containing the polymers in the ratio of 4 to 1 are satisfactory for a number of uses. The properties of the two resins referred to in the above example are given in Table B.

Table B
PROPERTIES OF RESIN IN THE COPOLYMER RATIOS 4:1 AND 9:1

| | 4:1 | 9:1 |
|---|---|---|
| Composition, vinylidene chloride: acrylonitrile | 80:20 | 90:10 |
| Form | (1) | (1) |
| Refractive index at 25° C | 1.580 | 1.594 |
| Specific gravity | 1.60 | 1.69 |
| Viscosity, centipoises, 20% in toluene centipoises, 15% in 65:35 methyl ethyl ketone: toluene at 60° C | Approx. 60 | 3.5–8.0 |
| Softening point, °C | 138–145 | |
| Water vapor transmission in grams per 100 sq. inches/24 hours/mil thickness of formed coating | 0.10 | 0.08 |
| Area factor, sq. inches per pound per mil thickness of formed coating | 17,300 | 16,500 |

[1] White powder.

These resins, and resins in other copolymer ratios, may be obtained from the Dow Chemical Company under the designation F-220 for the material in the copolymer ratio of 4 to 1 and F-242 for the material in the copolymer ratio of 9 to 1.

One particular advantageous property of the composition as taught herein is its ability to anchor a coating to a base sheet without any pre-treatment steps and without any necessity for forming intermediate layers.

One base sheet which has been found particularly satisfactory in the application of the coating is a sheet having a one mil gauge formed of regenerated cellulose, softened with glycerol, and having no pre-conditioning or pre-treatment prior to coating. Other base sheets having different thicknesses, different compositions, and/or different softeners, such as propylene glycol, triethylene glycol and the like, may be employed.

It was found that products having properties as described herein can be formed when a lacquer containing 15 to 20% polymer solids is used by coating a selected base sheet to achieve a finished copolymer coating weight of 3 to 4 grams per square meter total on both sides of the film and by passing the sheet through a tower maintained at a temperature of 125° C. for various periods of time up to about 12 seconds.

Considering this process now in fuller detail and with regard first to the lacquer, it has been found that 16% of the polymer described in Example 1 can be dissolved in a solvent of 65% methyl ethyl ketone, and 35% toluene by weight to give a clear solution at 75° C. The solution will tend to become cloudy as the temperature is allowed to drop below about 65° C., and accordingly, it is preferred to carry out the coating at temperatures in excess of 65° C.

A lacquer containing 20% solids becomes uncoatable below 50° C., even when the lacquer is stirred, due to the formation of a gel in the lacquer. The properties of the coating may easily be restored by heating to an appropriate coating temperature. Generally higher concentrations, in excess of about 10% are preferred in order that the process may be run at a high coating rate and in order to avoid the necessity for removing excess solvent.

Also when the coating is carried out at lower temperatures, for example, a temperature of about 45° C., using a lacquer containing 16% solids, the coating formed has a slightly milky appearance. When the lacquer has become gelatinous, the milky appearance is quite pronounced. Reheating of the lacquer will restore the clarity of both the lacquer and the coating formed from the reheated lacquer. Similar results are obtained when the solvent is methyl ethyl ketone and toluene in a ratio of 3 to 1 and also when these same solvent ingredients were present in a 65 to 35 ratio.

When the lacquer is coated at a temperature of 55° C., the lacquer acquires a hazy appearance, but the coating is perfectly clear. Accordingly, coating at temperatures of 55° C. and higher is advisable when the lacquer contains 16% solids by weight.

When a lacquer contained 20% solids in a solvent containing methyl ethyl ketone and toluene in a ratio of 3 to 1, the gelation occurs at 55° C. and the appearance of the coated film is less than perfectly clear when formed at about 63° C. Accordingly, a coating temperature above 63° C. and preferably above 70° C. should be used.

The lacquer has been found to have desirable storage qualities as evidenced by the following example.

EXAMPLE III

A solvent consisting of 65% methyl ethyl ketone and 35% toluene by weight was contained in a vessel. To this solvent a copolymer of vinylidene chloride and acrylonitrile, in a ratio of 9 to 1, was added to give a solution in which the polymer was present to the extent of 16% by weight. The following ingredients were added in percent by weight of the polymer content:

Additive ingredient: Percent by weight
    Melamine-formaldehyde (Uformite MM-55) __ 1.5
    Maleic acid _____ 1.0
    Aluminum silicate (Slipex B) _____ 0.5
    Beeswax _____ 1.0

The lacquer was maintained at 65° C. for 30 hours in a three-necked flask fitted with a mechanical stirrer rotating at 100 revolutions per minute, and with a reflux condenser. At elapsed times of 3, 5, 8, 12, 17, 23, and 30 hours, samples of lacquer were removed and coated on one mil thick plain, transparent glycerol-softened regenerated cellulose base sheet. The coating was dried in a conventional manner and tested three days later by immersion in water at 75° C. Coatings made within eight hours or less of coating formulation remained intact for three to four hours and then failed by blistering. Coated sheets prepared with samples taken after periods up to thirty hours could be maintained immersed in water for periods of at least two hours.

Accordingly, coating with freshly prepared lacquer is preferred.

EXAMPLE IV

A sample of lacquer was prepared to contain a vinylidene chloride and acrylonitrile copolymer in a 9 to 1 ratio, but no anchoring resin or acid was used. The copolymer was dissolved in methyl ethyl ketone-toluene solvent in the proportions and in a manner similar to that described in Example II and coated onto a regenerated cellulose base sheet, as also described therein. The coating thus formed became detached within 10 to 40 minutes after immersion in water at 75° C.

The addition to the lacquer of 1.5% of melamine-formaldehyde resin, and 1% of maleic acid, based on the copolymer solid content of the lacquer, followed by a repetition of the coating formation, resulted in a product having an increased anchorage, of approximately 3 to 5 hours.

Based on the procedure and materials described in Example 2, but using cyclohexanone as a solvent where a total coating weight of four grams per square meter and a drying time of twelve seconds were employed, a water vapor permeability equivalent to those of other polymer-coated films was obtained. Accordingly, coatings having the desired vapor permeability can be obtained in this manner. Greater weight of coating decreases the water vapor permeability. Control of the weight of coating can be achieved by change in the solids content of the lacquer in accordance with the following table to provide films having desired water vapor permeabilities.

Table C

EFFECT OF COATING WEIGHT AND DRYING TIME ON PERMEABILITY

| Coating Speed, ft./min. | Drying Time, Sec. | Lacquer Solids, Percent | Coating Weight, g./m.² | IPV [1], g./100 m.²/hr. |
|---|---|---|---|---|
| 65 | 2.6 | 7.5 | 0.8 | 559 |
| 65 | 2.6 | 10.0 | 1.4 | 356 |
| 65 | 2.6 | 12.5 | 1.8 | 354 |
| 65 | 2.6 | 15.0 | 3.1 | 182 |

[1] IPV is water vapor permeability.

With reference to the concentration of the anchoring additives employed, it was discovered unexpectedly that the increase in the quantity of the anchoring additives beyond a certain small value resulted in a decrease in the anchorage achieved. These results are given in the following table.

Table D

EFFECT OF RESIN AND ACID CONCENTRATIONS ON ANCHORAGE OF COATINGS

| Roll No. | Lacquer Additives, Percent of Polymer Solids | | Min. For Coating Failure in Water at 75° C. |
|---|---|---|---|
| | Melamine-Formaldehyde | Maleic Acid | |
| L58–153 | 0 | 0 | 40 |
| L58–154 | 1.5 | 1.0 | 450 |
| L58–155 | 3.0 | 2.0 | 420 |
| L58–156 | 6.0 | 4.0 | 240 |

When the lacquer is formed and maintained at a temperature of approximately 45° C. prior to coating, aging has no apparent effect on the anchorage of the lacquer when the lacquer had a cyclohexanone solvent base.

The preferred drying time to remove the solvent is a time sufficient to free the coating of any tackiness due to the presence of solvent and may be as long as is sufficient to remove traces detectable by absorption spectra. When the drying tower temperature is 125° C., 12 seconds is sufficient to remove the solvent completely from the formed coating. A small amount of cyclohexanone solvent will remain after a drying period of about 6 seconds at a temperature of 125° C.

The time and temperature required for drying may in some cases reduce the moisture content of the base film below a desired value. This moisture may be restored by a separate rehumidifying step as by exposing the film to an atmosphere having a relative humidity of 35% at 75° F. for a few days. A three day exposure is sufficient to increase the moisture content from a value below 3% to a value of 5 to 7%. It is preferred to restore the moisture content before testing the physical properties of the film.

The coating as formed with the preferred polymer and anchoring agent content is found to have a slightly tacky surface. When this tackiness is found objectionable, it is possible to improve the slip of the film by the addition of a certain combination of slip additives. As stated above, the addition of a combination of beeswax and Slipex B provides exceptionally good slip. A beeswax having a specific gravity at 15° C. of from 0.958 to 0.970, and a solidification point of from 60 to 65° C., a refractive index at 75° C. of between 1.4300 and 1.4451, a saponification value of between 90 and 102, and an acid value of from 16.8 to 24, when added to the lacquer to the extent of about 1% of polymer solids together with approximately 0.5% of Slipex B, will give to the film excellent slip properties. These slip-inducing additives may be used with either the cyclohexanone solvent or a methyl ethyl ketone solvent. When using cyclohexanone, adequate results are obtained if Sunoco 5512, a petroleum wax available from the Sun Oil Company, is used in the place of the beeswax. Other waxes useful in improving the properties of the coating are esparto, ouricury, candelilla, and sugar cane wax.

The permeability of the coated film to water vapor, when the film contains the various additives disclosed above, is in the range of 50 to 150. Water vapor permeability is a measure, in grams, of the weight of water per hour which is passed through 100 square meters of film per hour over a 24-hour period at a temperature of 39.5±0.5° C. at a humidity differential through the film of at least 90%.

In the description above, the term "heat-sealable" is meant to indicate the ability of two sheets of film to be joined in such manner as to require a force of 25 grams or more for each 1.5 square inches of film to separate the coating from the base sheet. This determination of force is made after the film has been joined to another portion of the same film for 0.5 second at a temperature of 250 to 300° F. under a pressure of 2 ounces per square inch.

The term "heat seal strength" in the foregoing indicates the force in grams required to separate two sheets of film 1.5 inches in width after the sheets have been brought together for two seconds at a temperature of 130° C. under a pressure of 20 pounds per square inch over an area of 1.5 inches by 0.75 inch and exposed to an atmosphere of 75° F. at 35% relative humidity, or 75° F. and 81% relative humidity where appropriate, for three days.

A number of modifications of the ingredients and steps of these examples may be made without departing from the scope of the subject invention.

The concentration of the resin solids used in the composition may vary and other resins may be used in place of that illustratively disclosed. Alternate condensible resins such as modified solvent-soluble urea-formaldehyde resins or modified solvent-soluble melamine-formaldehyde resins are examples.

Similarly, the concentration of the acid catalyst may be varied and alternative solvent-soluble acids such as maleic, aconitic, citric, itaconic, or combinations thereof may be used. Generally polycarboxyl solvent-soluble acids are useful in accelerating the condensation of the resins. Those having higher ionization constants in water will also augment anchorage of the coatings. Acids having constants above this value are preferred because of the economy of materials used and the good anchorage obtained.

Smaller percentages of both the condensible resins and acid catalysts are preferred because of the effectiveness as anchoring agents of these materials in lower percentages, as shown in Table D, and because of their relatively higher cost.

In order to demonstrate the properties of products formed in accordance with examples, a number of tests were carried out, using a test sample prepared as described in the example and another, or control sample, prepared in an identical manner but without resin and acid ingredients. In one such test, the resistance of the coating to sloughing or otherwise separating from the base sheet was measured by immersing both the test and control materials in water at 75° C. It was found that the resistance of the test sheet to sloughing was several times greater than that of the control coating which did not contain the resin and acid additives.

As many examples of the foregoing procedures and articles may be carried out and made, and as many modifications can be made in the procedures and articles described without departing from the scope of the subject invention, the foregoing is to be interpreted as illustrative only, and not as defining or limiting the scope of the invention.

We claim:

1. The process of forming a flexible coated film of low permeability to vapors and greases, which comprises providing a lacquer containing 10 to 20 percent by weight of a copolymer of more than four parts by weight of vinylidene chloride with one part by weight of acrylonitrile dissolved in a volatile organic solvent, said lacquer also containing dissolved therein about 1.5 to 3 percent, based on the weight of said copolymer, of a condensible resin selected from the group consisting of solvent-soluble urea-formaldehyde and solvent-soluble melamine-formaldehyde resins, and about 1 to 2 percent, based on the weight of said copolymer, of a solvent-soluble organic acid selected from the group consisting of maleic, aconitic, citric and itaconic acids;

coating said lacquer on a regenerated cellulose film in a thin layer relative to the thickness of said film; and heating said coated film to evaporate said solvent and anchor said layer to said film.

2. A flexible coated film, having low permeability to vapors and greases, consisting essentially of a regenerated cellulose base and a thin surface layer of a copolymer of about 9 parts by weight of vinylidene chloride and 1 part of acrylonitrile anchored to said base, said layer containing an anchoring resin distributed uniformly therethrough, said resin being formed from about 1.5% to 3.0% of solvent-soluble melamine-formaldehyde resin reacted with about 1% to 2% of maleic acid, said percentages being based on the weight of said copolymer.

References Cited in the file of this patent

UNITED STATES PATENTS

| | | |
|---|---|---|
| 2,301,959 | Lanning | Nov. 17, 1942 |
| 2,525,671 | Hauser | Oct. 10, 1950 |
| 2,543,094 | Brighton et al. | Feb. 27, 1951 |
| 2,570,478 | Pitzl | Oct. 9, 1951 |
| 2,606,894 | Pitzl | Aug. 12, 1952 |
| 2,711,996 | Hofrichter | June 28, 1955 |
| 2,751,316 | Philips | June 19, 1956 |
| 2,856,314 | Wooding et al. | Oct. 14, 1958 |
| 2,864,724 | Keim | Dec. 16, 1958 |
| 2,910,385 | Berry et al. | Oct. 27, 1959 |
| 2,977,246 | Fisher et al. | Mar. 28, 1961 |
| 2,985,542 | Pinsky et al. | May 23, 1961 |

OTHER REFERENCES

"Saran Resin F-120" Dow Chemical Co., November 1954, 20 pp.